United States Patent
Li et al.

(10) Patent No.: US 8,972,884 B2
(45) Date of Patent: Mar. 3, 2015

(54) PRESENTING INFORMATION PERTAINING TO A PLURALITY OF TABS IN AN INSTANT MESSAGING APPLICATION

(75) Inventors: Jing Li, Hangzhou (CN); Hongbing Tang, Hangzhou (CN)

(73) Assignee: Alibaba Group Holding Limited, Cayman Islands (KY)

( * ) Notice: Subject to any disclaimer, the term of this patent is extended or adjusted under 35 U.S.C. 154(b) by 406 days.

(21) Appl. No.: 12/800,302

(22) Filed: May 11, 2010

(65) Prior Publication Data

US 2010/0299625 A1 Nov. 25, 2010

(30) Foreign Application Priority Data

May 21, 2009 (CN) .......................... 2009 1 0202883

(51) Int. Cl.
*G06F 3/048* (2013.01)
*G06F 3/0481* (2013.01)
*G06F 9/44* (2006.01)

(52) U.S. Cl.
CPC .............. *G06F 3/0481* (2013.01); *G06F 9/443* (2013.01)
USPC .......................................... 715/777; 715/790

(58) Field of Classification Search
USPC ................................. 715/777, 790
See application file for complete search history.

(56) References Cited

U.S. PATENT DOCUMENTS

| | | | | |
|---|---|---|---|---|
| 5,305,435 A | * | 4/1994 | Bronson | 715/777 |
| 5,561,757 A | * | 10/1996 | Southgate | 715/790 |
| 6,266,684 B1 | * | 7/2001 | Kraus et al. | 715/209 |
| 6,519,629 B2 | | 2/2003 | Harvey et al. | |
| 6,593,944 B1 | * | 7/2003 | Nicolas et al. | 715/744 |
| 6,741,268 B1 | * | 5/2004 | Hayakawa | 715/777 |
| 7,181,698 B2 | * | 2/2007 | Shahrbabaki et al. | 715/790 |
| 7,475,359 B2 | * | 1/2009 | Hudson, Jr. | 715/777 |
| 7,487,455 B2 | * | 2/2009 | Szeto | 715/752 |
| 8,156,443 B2 | * | 4/2012 | Quillen et al. | 715/758 |
| 8,166,414 B2 | * | 4/2012 | Cragun et al. | 715/777 |
| 2002/0054052 A1 | * | 5/2002 | Sharma et al. | 345/700 |
| 2003/0128239 A1 | * | 7/2003 | Angal et al. | 345/762 |
| 2004/0041841 A1 | | 3/2004 | LeMogne et al. | |
| 2004/0056893 A1 | * | 3/2004 | Canfield et al. | 345/753 |
| 2004/0113948 A1 | * | 6/2004 | Shahrbabaki et al. | 345/777 |
| 2005/0038796 A1 | * | 2/2005 | Carlson et al. | 707/100 |
| 2005/0039134 A1 | | 2/2005 | Wiggeshoff et al. | |
| 2005/0235219 A1 | * | 10/2005 | Szeto | 715/788 |
| 2006/0026245 A1 | | 2/2006 | Cunningham et al. | |
| 2006/0195454 A1 | * | 8/2006 | Davis et al. | 707/100 |
| 2006/0218500 A1 | * | 9/2006 | Sauve et al. | 715/767 |

(Continued)

FOREIGN PATENT DOCUMENTS

JP H0456993 2/1992

*Primary Examiner* — Steven Sax
*Assistant Examiner* — Wilson Varga
(74) *Attorney, Agent, or Firm* — Van Pelt, Yi & James LLP

(57) ABSTRACT

Presenting information in an instant messaging (IM) application includes loading a tab configuration file comprising attribute information pertaining to a plurality of tabs in a main interface in the IM application, the attribute information comprising presented content information associated with the plurality of tabs; receiving a selection of one of a plurality of tabs in the main interface; retrieving attribute information that corresponds to the selected one of the plurality of tabs based at least on the tab configuration file information; and dynamically creating an extended window for the tab; and displaying the presented content information of the selected tab in the extended window.

16 Claims, 5 Drawing Sheets

(56) References Cited

U.S. PATENT DOCUMENTS

| | | | |
|---|---|---|---|
| 2007/0067733 A1* | 3/2007 | Moore et al. | 715/777 |
| 2007/0124701 A1* | 5/2007 | Gong et al. | 715/854 |
| 2007/0143662 A1 | 6/2007 | Carlson et al. | |
| 2008/0040433 A1 | 2/2008 | Glasgow | |
| 2008/0046506 A1* | 2/2008 | Broda | 709/203 |
| 2008/0046510 A1 | 2/2008 | Beauchamp et al. | |
| 2008/0163090 A1* | 7/2008 | Cortright | 715/771 |
| 2009/0132949 A1* | 5/2009 | Bosarge | 715/777 |
| 2009/0171993 A1* | 7/2009 | Arthursson | 707/100 |
| 2009/0210820 A1* | 8/2009 | Adachi et al. | 715/786 |

* cited by examiner

PRESENTING INFORMATION PERTAINING TO A PLURALITY OF TABS IN AN INSTANT MESSAGING APPLICATION

CROSS REFERENCE TO OTHER APPLICATIONS

This application claims priority to the People's Republic of China Patent Application No. 200910202883.3 entitled METHOD AND DEVICE FOR PRESENTING TAB CONTENTS IN IM SOFTWARE filed on May 21, 2009 which is incorporated herein by reference for all purposes.

FIELD OF THE INVENTION

The present invention relates to Instant Message (IM) applications and in particular to a method and device for presenting content in IM applications.

BACKGROUND OF THE INVENTION

Instant Messaging (IM) applications are very popular communications software used by web portals and e-commerce websites. Examples of IM applications include Windows Live Messenger, Yahoo Messenger, Ali Wang Wang, Netease Pao Pao, and the like. They are mainly intended to enable a user to locate rapidly, conduct a real time talk, and mutual information transfer with a friend or a business partner of the user over the Internet. Moreover, much of the existing IM software is also integrated with functions of data exchange, voice chat, network conference, email, etc.

FIG. 1 is an example graphic user interface (GUI) used in certain existing IM applications. A main interface 10 includes a multi-tab area 11 and a primary presentation area 12. The tab area 11 contains several tabs 13. A display control on main interface 10 of the IM software is typically generated when the application executes. When a user selects one of the tabs, content to be presented corresponding to the selected tab is displayed in the primary presentation area 12. This process is commonly referred to as tab switching. In some implementations, special display code is programmed for each tab. The display code is in turn embedded in the display control code of the main interface. When the user switches tabs, the display code of the newly selected tab is invoked to display the contents of the tab.

The existing implementation has several drawbacks. For example, since the tab display code is embedded in the display control code of the main interface, the programmer has to consider the issues of interaction, cooperation, and logical coupling between the tab presentation areas and the control on interface elements of the main interface. Thus, a change to the contents of the main interface will affect directly the presentation of tab contents and a change to a presentation area of tab contents will also affect the layout of the main interface, making the implementation of the tab code cumbersome. Also, the current implementation typically results in poor extendibility. When tabs are added or removed in the tab area 11, the code corresponding to the main interface 10 has to be modified, taking in account not only the tab contents but also the layout of the main interface. This would require both more time and effort by the programmer and would make the software more error-prone. Additionally, considerable system resources have to be devoted to tracking the tab contents. Since the contents of the tabs is regarded as a sub-component of the main interface, a presentation area of the tab contents tends to be created along with a "Contact List" after the main interface is created. Although the presentation area is hidden, additional system resources such as memory, handles, etc., are still occupied while the program is running. Lastly, the strong coupling involved in the existing implementation may discourage the division of programming tasks by developers during development of the application.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
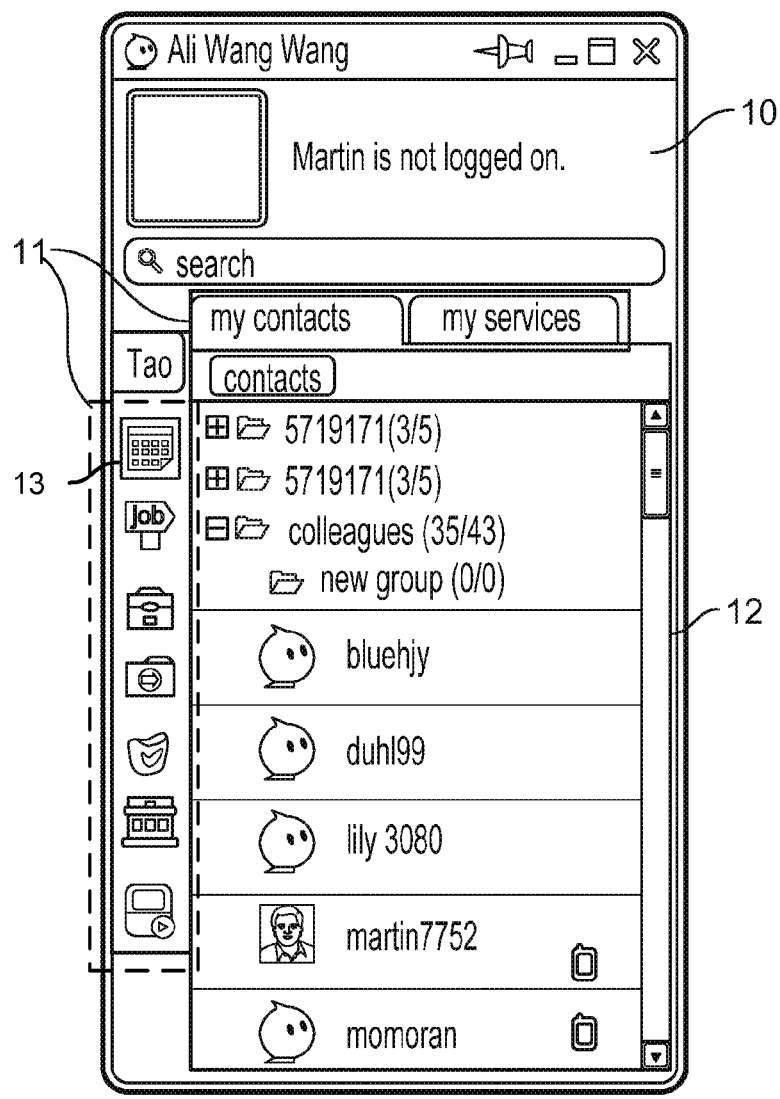
FIG. 1 is an example graphic user interface (GUI) used in certain existing IM application.
Figure 2:
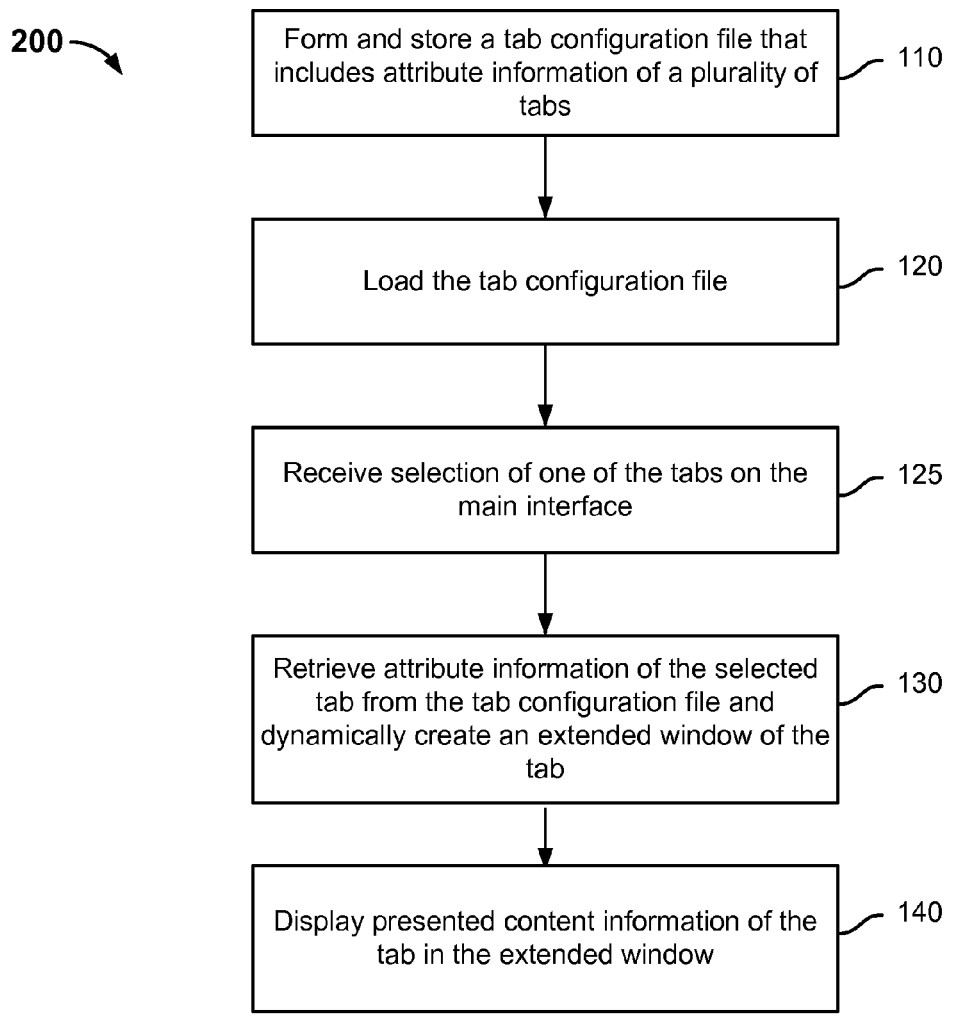
FIG. 2 is a flowchart illustrating an embodiment of a process for presenting information in an IM application.

FIG. 2 is a flowchart illustrating an embodiment of a process for presenting information in an IM application. Process 200 may be implemented on a computer system including one or more processors, including a personal computer, a mobile device such as a smart phone, a personal digital assistant (PDA) device, etc.

At 110, a tab configuration file that includes attribute information pertaining to a plurality of tabs in the main interface is formed and stored at a storage location. The attribute information includes information of contents that is presented in the tabs (also referred to as presented content information). In some embodiments, the presented content information of a tab includes a Universal Resource Locator (URL) that corresponds to the tab. In various embodiments, the attribute information may further include identifiers (IDs), names, display titles, icons, and/or any other appropriate properties of the tabs, sequence of the tabs, whether a tab is to be displayed by default, default sizes of the tabs, etc.

In some embodiments, one tab configuration file is configured for a main interface. The tab configuration files store the attribute information for each tab. In this example, the tab configuration file is an Extensible Markup Language (XML) file that describes attribute information using a series of user defined tags. XML format has the properties of extendibility and universality; in other words, the definitions of data in the file can be easily expanded and the file can be easily shared across multiple platforms such as Windows, Mac OS, Linux, etc. The tab configuration file can be written using any appropriate XML file generator. In this example, the tab configuration file stores the attribute information of the respective tabs sequentially, according to the tab order. Each tab is associated with a tab identifier.

In order to add a new tab in the main interface of the IM application, an attribute corresponding to the tab is stored in the tab configuration file. When a change to the attribute information of one of the tabs occurs, the corresponding attribute information in the tab configuration file can be modified without affecting the rest of the program segments relating to the attribute. For example, if the tab ID of a tab M is set to "*", then it will be sufficient to simply store TABMID="*" among the tab attributes in the tab configuration file, to use the variable TABMID for the tab ID of the tab M in all program code segments involved in a display of the main interface, and to fetch directly TABMID="***" from the tab configuration file so as to execute program code involved in a display of the main interface.

At 120, the tab configuration file is loaded. When the IM software is initiated, the IM application parses the loaded tab configuration file to set various attributes for the tabs as well as the main interface, which is displayed. Although the tab configuration file is typically loaded when the IM software is initiated, the tab configuration file may be loaded in other situations. For example, the tab configuration file can also be loaded when a tab is selected.

At 125, one of the tabs on the main interface is selected by the user and the selection is received by the IM application.

At 130, upon receiving tab selection information, the corresponding attribute information of the selected tab is retrieved from the tab configuration file to dynamically create an extended window of the tab. Information required to create the extended window is fetched from the tab configuration file, including default size information of the extended window, title bar information of the extended window, content to be displayed, etc.

At 140, the presented content information of the tab is displayed in the extended window. In some embodiments, the presented content information of the tab includes a URL and contents associated with the URL is rendered in the extended window and displayed.

When the tab area is selected and the extended window is opened, position information in a screen where the main interface is located is fetched and position information of the extended window on the screen is determined. In some embodiments, regardless of the position of the main interface in the screen, a full display of the opened window in the screen shall be ensured. The opened window can be displayed to the left of the main interface or alternatively displayed to the right of the main interface if a full display to the left of the screen is not possible. The newly opened window can be displayed overlying the main interface if a full display may be impossible to either side of the main interface.

Figure 3:
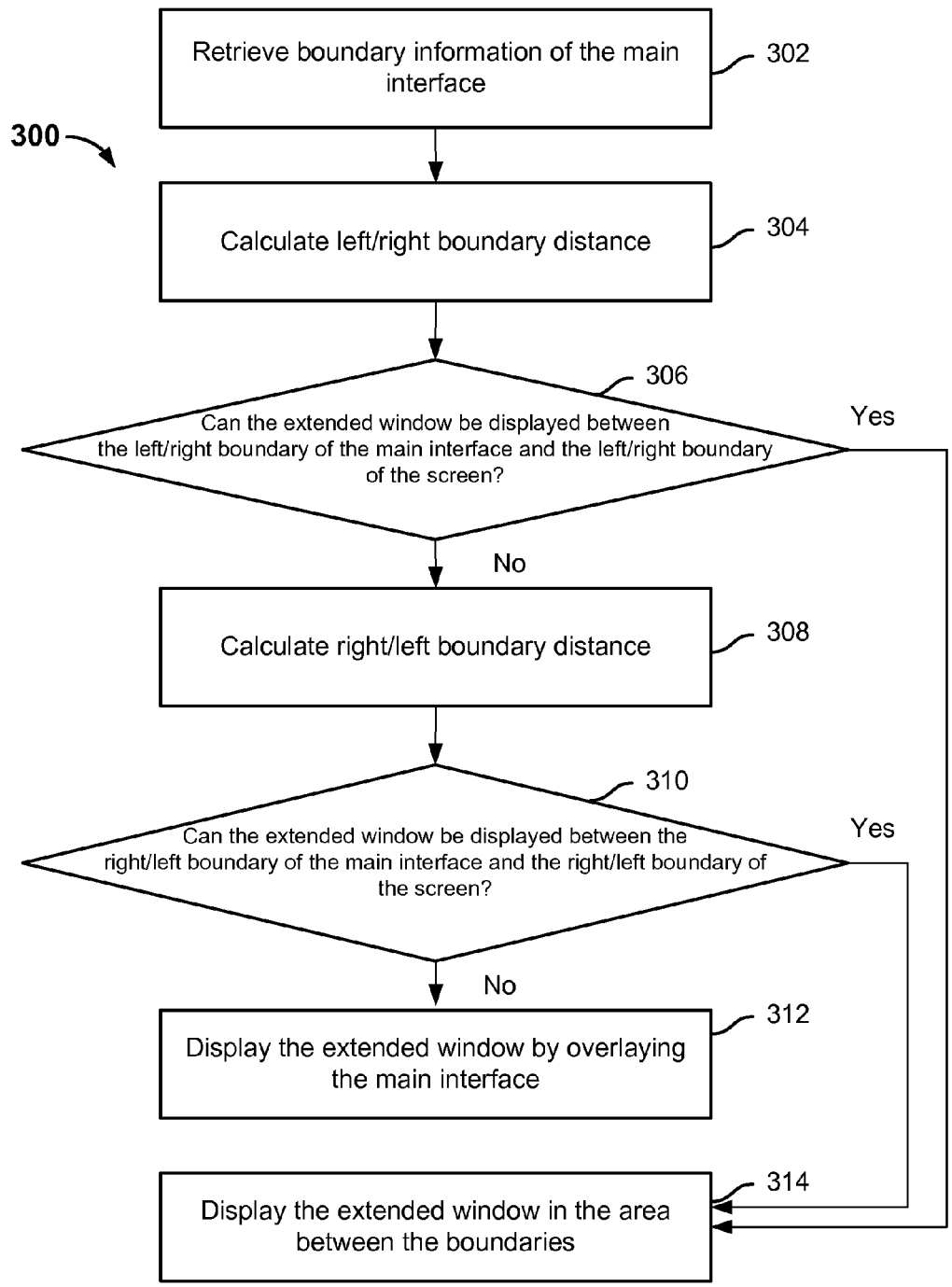
FIG. 3 is a flowchart illustrating an embodiment of a process for displaying the interface of an IM application.

FIG. 3 is a flowchart illustrating an embodiment of a process for displaying the interface of an IM application. Process 300 may be used to implement step 130 of FIG. 2. At 302, boundary information of the main interface is located on the screen and retrieved. In this example, both the left boundary and the right boundary of the main interface are retrieved. At 304, a boundary distance between a boundary on the main interface and the boundary of the screen on the same side is calculated and compared with a display width that is determined according to the tab attribute. Either the left boundary or the right boundary of the main interface can be initially chosen and the boundary distance between the left (or right) boundary of the main interface and the left (or right) boundary of the screen is calculated and compared. At 306, based on the comparison, it is determined whether the extended window can be displayed in the area between the left (or right) boundary on the main interface and the left (or right) boundary of the screen. If so, at 314, the extended window is displayed in that area; otherwise, the right (or left if the right boundary was chosen previously) boundary distance is calculated at 308. At 310, it is determined whether the extended window can be displayed in the area between the right (or left) boundary on the main interface and the right (or left) boundary of the screen. If so, control is passed to 314 and the extended window is displayed in this area. Otherwise, control is passed to 312 and the extended window is displayed by overlying the main interface.

Figure 4:
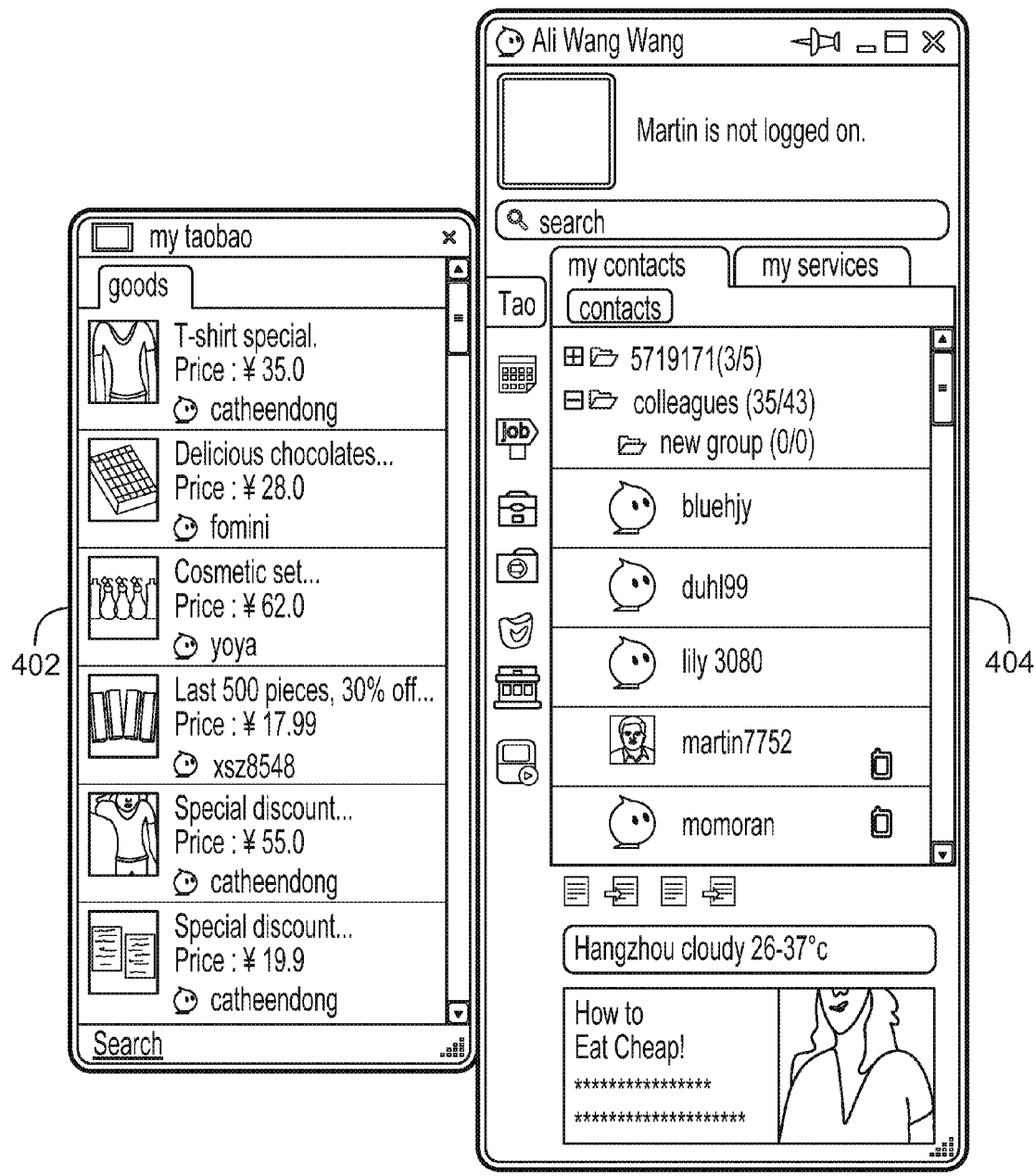
FIG. 4 is a diagram illustrating an embodiment of a user interface display of an IM application according to the present invention.

FIG. 4 is a diagram illustrating an embodiment of a user interface display of an IM application according to the present invention. An extended window 402 is displayed to the left of the main interface 404. In this example the extended window can be dragged freely since it is independent of the main interface and the contents in the extended window can be viewed at the same time as the contents displayed in the primary presentation area in the main interface (e.g., a contact list). The user is allowed to frequently switch between tabs.

Since a separate file is used to store the attribute information for the tabs, when an attribute needs to be modified, its corresponding value is retrieved from the file and modified. Such a design leads to better extendibility and is less likely to cause programming error stemming from interdependencies of tab code. More importantly, since the implementation does not display tabs in the primary presentation area of the main interface but instead creates an extended window separately displaying contents relating to a selected tab, a significant reduction of occupied system resources is achieved.

In the present embodiment, a tab configuration file includes a system tab configuration file and a user tab configuration file. The system tab configuration file includes attribute information of all tabs available in the application. To provide more personalized services, one or more user tab configuration files are used. The user tab configuration file includes attribute information of tabs applicable to specific users. Different users may have different user tab configuration files since the users can choose to add or delete tabs from the default selections. The IM application has access to the system tab configuration file and creates the user tab configuration file based on a copy of the system tab configuration file if no user tab configuration file is initially available. Upon reception of a modified tab attribute from the user, the corresponding user setting is stored in the user tab configuration file.

In this example, the system tab configuration file is named Stabconfig.xml and the user tab configuration file is named Utabconfig.xml. The Stabconfig.xml includes information descriptive of several tabs, e.g., IDs of the tabs, names of the tabs, hints of the tabs, URLs of the tabs, icons of the tabs, the sequence of the tabs, which tab is to be displayed by default, etc. The Utabconfig.xml includes descriptions of those tabs of interest to the user, e.g., IDs of the tabs, the sequence of the tabs, etc. In some embodiments, a directory with the ID of a particular user is created and the Utabconfig.xml file for this user is stored in the directory. In some embodiments, a single Utabconfig.xml file is used for multiple users, in which information is organized according to different users.

When the IM software is initiated, Stabconfig.xml is loaded and then Utabconfig.xml is loaded. If Utabconfig.xml is absent, then a display is presented as described in the Stabconfig.xml, and a copy of the Stabconfig.xml for the current user is saved in a directory of the user as the Utabconfig.xml of the user; if Utabconfig.xml is present, only the tabs described in Utabconfig.xml of the user are, as described in the Utabconfig.xml, displayed in the sequence of the tabs as set therein.

When the user selects one of the tabs, the attributes of the selected tab such as the name, icon, URL, etc. are retrieved. Subsequently, an extended window is created dynamically, the position of the main interface is retrieved, the extended window is displayed appropriately in place, an icon and a title of the extended window are set, and contents specified by the URL are displayed in the extended window.

When the user performs an operation of hiding, displaying, or adjusting the order of a tab in the sequence of tabs, the program modifies the Utabconfig.xml of the user to store the setting of the user.

In some implementations, no parent-child relationship is present between the extended window and the main interface. Thus, when the extended window is created, the extended window is set to hold a handle of the main interface and the main interface is set to hold a handle of the extended window. Messages are transferred between the handles to enable communication between the main interface and the extended window. In some embodiments, a main interface control unit in the main interface and an extended window control unit in the extended window are objects used to handle the messages.

The following illustrates pseudocode used in one implmenetation:

```
SetNewWindowPosition(pointNew);
ShowNewWindow( );
// a communication mechanism between the extended window and the
// main interface the handle of the main interface is passed to the extended
// window as a parameter when the extended window is created
// the two independent windows are associated
SetMainWindowHandle(hMainWnd);
// the extended window instructs the main interface to do something by
// sending a message thereto
::SendMessage(hMainWnd, message, wParam, lParam);
```

Several common communication scenarios are described. In one scenario, after the extended window is closed by the user, the main interface control unit is notified through the handle of the main interface about the closure and the main interface control unit controls the main interface to change a corresponding tab status. In another scenario, after the main interface is minimized or closed, the extended window control unit is notified through the handle of the extended window about the minimization closure and the extended window control unit directs the extended window to be minimized or closed. In another scenario, when a currently selected one of the tabs in the main interface is hidden, the extended window control unit is notified through the handle of the extended window about the hiding of the tab and the extended window control unit controls the extended window.

Figure 5:
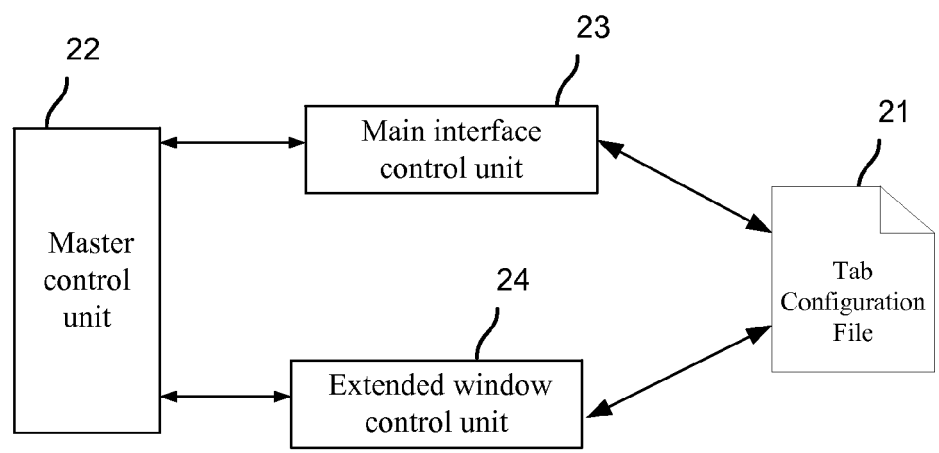
FIG. 5 is a block diagram illustrating an embodiment of a system for implementing the IM software.

FIG. 5 is a block diagram illustrating an embodiment of a system for implementing the IM software. In this example, a tab configuration file 21 is adapted to store attribute information of respective tabs. The attribute information includes presented content information of the tabs. Tab configuration file 21 is a part of the IM software. When the IM software is downloaded by a web client, tab configuration file 21 is also downloaded to the client and stored in a storage unit of the client. In some embodiments, the tab configuration file further includes a system tab configuration file and a user tab configuration file. When a tab attribute is modified by the user, the corresponding user setting is stored in the user tab configuration file.

The system includes a master control unit 22, a main interface control unit 23, and an extended window control unit 24. The units can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The units may be implemented on a single device or distributed across multiple devices. The functions of the units may be merged into one another or further split into multiple sub-units.

In this example, master control unit 22, main interface control unit 23, and extended window control unit 24 are implemented as software modules executing on one or more processors. Master control unit 22 is adapted to load the tab configuration file and initiate a main interface control unit 23 to display the main interface when the IM software is initiated, and to initiate an extended window control unit 24 when one of the tabs is selected. Main interface control unit 23 is adapted to control a display of the main interface. Extended window control unit 24 is adapted to retrieve the corresponding attribute information from the tab configuration file, to create dynamically an extended window of the tab, and to control a display of the extended window.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for presenting information in an instant messaging (IM) application, comprising:
   storing a tab configuration file on a computer system having a single display screen, the computer system comprising one of a personal computer (PC), a smart phone, and a personal digital assistant (PDA),
      wherein the tab configuration file includes attribute information corresponding to respective ones of a plurality of tabs in a main interface in the IM application, wherein the attribute information includes presented content information corresponding to respective ones of the plurality of tabs, wherein the attribute information includes a plurality of tab identifiers and a plurality of tab tags corresponding to respective ones of the plurality of tabs;

loading the tab configuration file and presenting in the main interface of the IM application the plurality of tab identifiers included in the attribute information, wherein the tab configuration file is loaded in response to an initiation of the IM application, receiving a selection of one of the plurality of tabs presented in the main interface of the IM application;

in response to the selection of the one of the plurality of tabs:

retrieving from the stored tab configuration file attribute information that corresponds to the selected one of the plurality of tabs based at least on the tab configuration file tab tag, wherein the retrieved attribute information that corresponds to the selected one of the plurality of tabs is configured to be used to create an extended window associated with the selected one of the plurality of tabs, wherein the retrieved attribute information that corresponds to the selected one of the plurality of tabs comprises default size information associated with the extended window;

dynamically creating the extended window for the selected one of the plurality of tabs based at least in part on the retrieved attribute information, determining position information of the extended window by:

retrieving boundary information on the single display screen where the main interface is located;

calculating a boundary distance from a boundary of the main interface to a boundary of the single display screen;

comparing the boundary distance with a display width to determine whether the extended window can be displayed in an area between the boundary of the main interface and the boundary of the single display screen; and either in the event that the extended window can be displayed in the area between the boundary of the main interface and the boundary of the single display screen then displaying the extended window in an area adjacent to the main interface wherein the extended window is operable to be moved independently of the main interface of the IM application, or in the event that the extended window cannot be displayed in the area between the boundary of the main interface and the boundary of the single display screen, then displaying the extended window to overlay the main interface of the IM application.

2. The method of claim 1, wherein the tab configuration file includes a system tab configuration file and a user tab configuration file.

3. The method of claim 2, further comprising storing a corresponding user setting in the user tab configuration file upon receiving a user modified tab attribute.

4. The method of claim 1, further comprising configuring the extended window with a handle of the main interface and configuring the main interface with a handle of the extended window.

5. The method of claim 4, further comprising establishing communication between a main interface control unit and an extended window control unit through message transfer between the handles.

6. The method of claim 5, further comprising notifying the main interface through the handle of the main interface about an activity that took place on the extended window.

7. The method of claim 1, wherein the presented content information comprises a URL.

8. The method of claim 1, wherein the tab configuration file includes at least one of a system tab configuration file and a user tab configuration file and wherein loading the tab configuration file includes:

determining whether the user tab configuration file is present, wherein in the event that the user tab configuration file is not present, loading the system tab configuration file, and wherein in the event that the user tab configuration file is present, loading the user tab configuration file.

9. A system for presenting information in an instant messaging (IM) application, comprising:

one or more processors adapted to:

store a tab configuration file on a computer system having a single display screen, the computer system comprising one of a personal computer (PC), a smart phone, and a personal digital assistant (PDA), wherein the tab configuration file includes attribute information corresponding to respective ones of a plurality of tabs in a main interface in the IM application, wherein the attribute information includes presented content information corresponding to respective ones of the plurality of tabs, wherein the attribute information includes a plurality of tab identifiers and a plurality of tab tags corresponding to respective ones of the plurality of tabs;

load the tab configuration file and present in the main interface of the IM application the plurality of tab identifiers included in the attribute information, wherein the tab configuration file is loaded in response to an initiation of the IM application, receive a selection of one of the plurality of tabs presented in the main interface of the IM application;

in response to the selection of the one of the plurality of tabs:

retrieve from the stored tab configuration file attribute information that corresponds to the selected one of the plurality of tabs based at least on the tab configuration file tab tag, wherein the retrieved attribute information that corresponds to the selected one of the plurality of tabs is configured to be used to create an extended window associated with the selected one of the plurality of tabs, wherein the retrieved attribute information that corresponds to the selected one of the plurality of tabs comprises default size information associated with the extended window; and dynamically create the extended window for the selected one of the plurality of tabs based at least in part on the retrieved attribute information, determining position information of the extended window by:

retrieving boundary information on the single display screen where the main interface is located;

calculating a boundary distance from a boundary of the main interface to a boundary of the single display screen;

comparing the boundary distance with a display width to determine whether the extended window can be displayed in an area between the boundary of the main interface and the boundary of the single display screen; and either in the event that the extended window can be displayed in the area between the boundary of the main interface and the boundary of the single display screen then displaying the extended window in an area adjacent to the main interface wherein the extended window is operable to be moved independently of the main interface of the IM application, or in the event that the extended window cannot be displayed in the area between the boundary of the main interface and the boundary of the single display screen, then displaying the extended window to overlay the main interface of the IM application; and one or more memories coupled to the one or more processors, adapted to provide the processors with instructions.

10. The system of claim 9, wherein the tab configuration file includes a system tab configuration file and a user tab configuration file.

11. The system of claim 10, wherein the one or more processors are further adapted to store a corresponding user setting in the user tab configuration file upon receiving a user modified tab attribute.

12. The system of claim 9, wherein the one or more processors are further adapted to configure the extended window with a handle of the main interface and configure the main interface with a handle of the extended window.

13. The system of claim 12, wherein the one or more processors are further adapted to establish communication between a main interface control unit and and an extended window control unit through message transfer between the handles.

14. The system of claim 13, wherein the one or more processors are further adapted to notify the main interface through the handle of the main interface about an activity that took place on the extended window.

15. The system of claim 9, wherein the presented content information comprises a URL.

16. The system of claim 9, wherein the tab configuration file includes at least one of a system tab configuration file and a user tab configuration file and wherein loading the tab configuration file includes:

determining whether the user tab configuration file is present, wherein in the event that the user tab configuration file is not present, loading the system tab configuration file, and wherein in the event that the user tab configuration file is present, loading the user tab configuration file.

\* \* \* \* \*